United States Patent Office 3,175,571
Patented Mar. 30, 1965

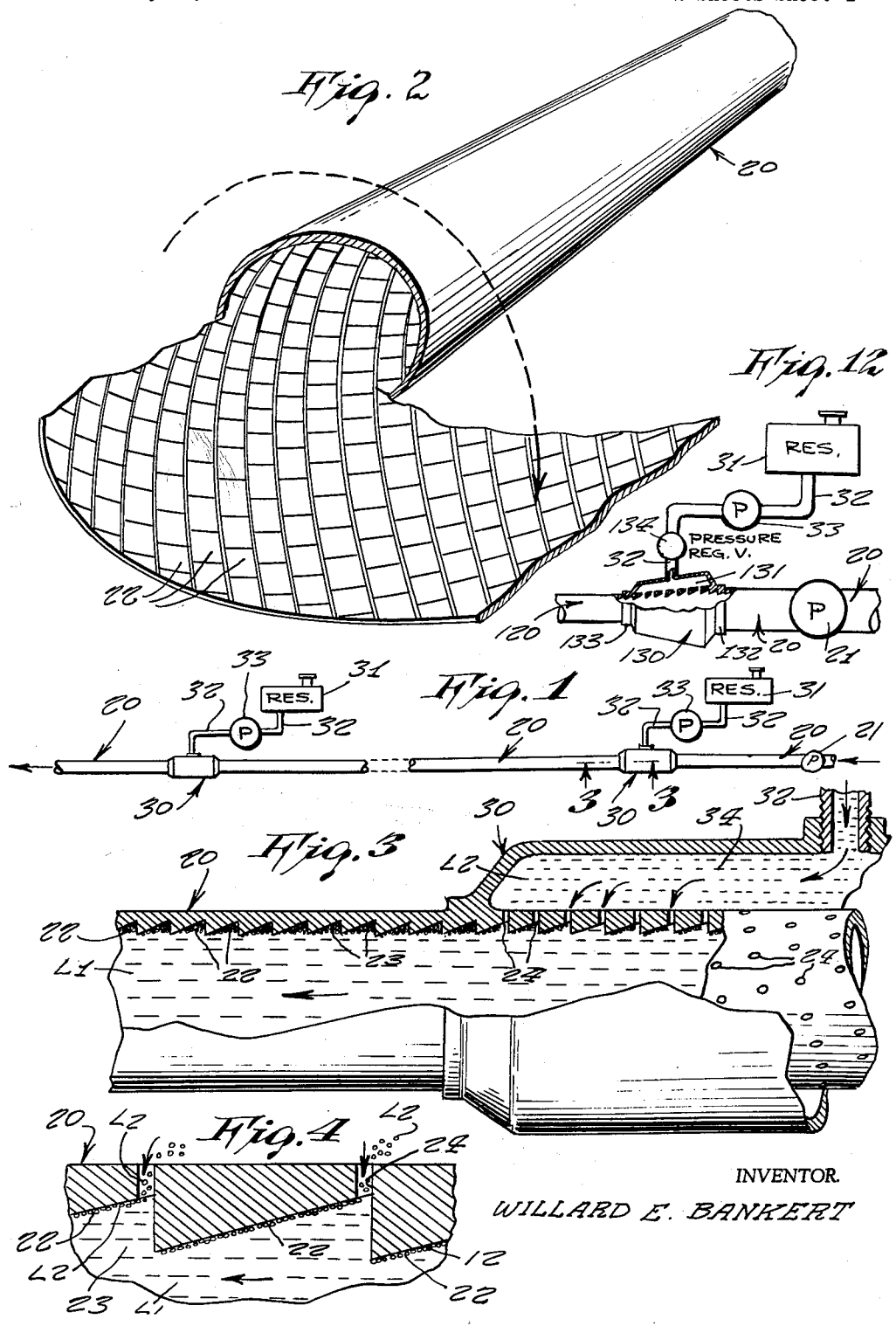

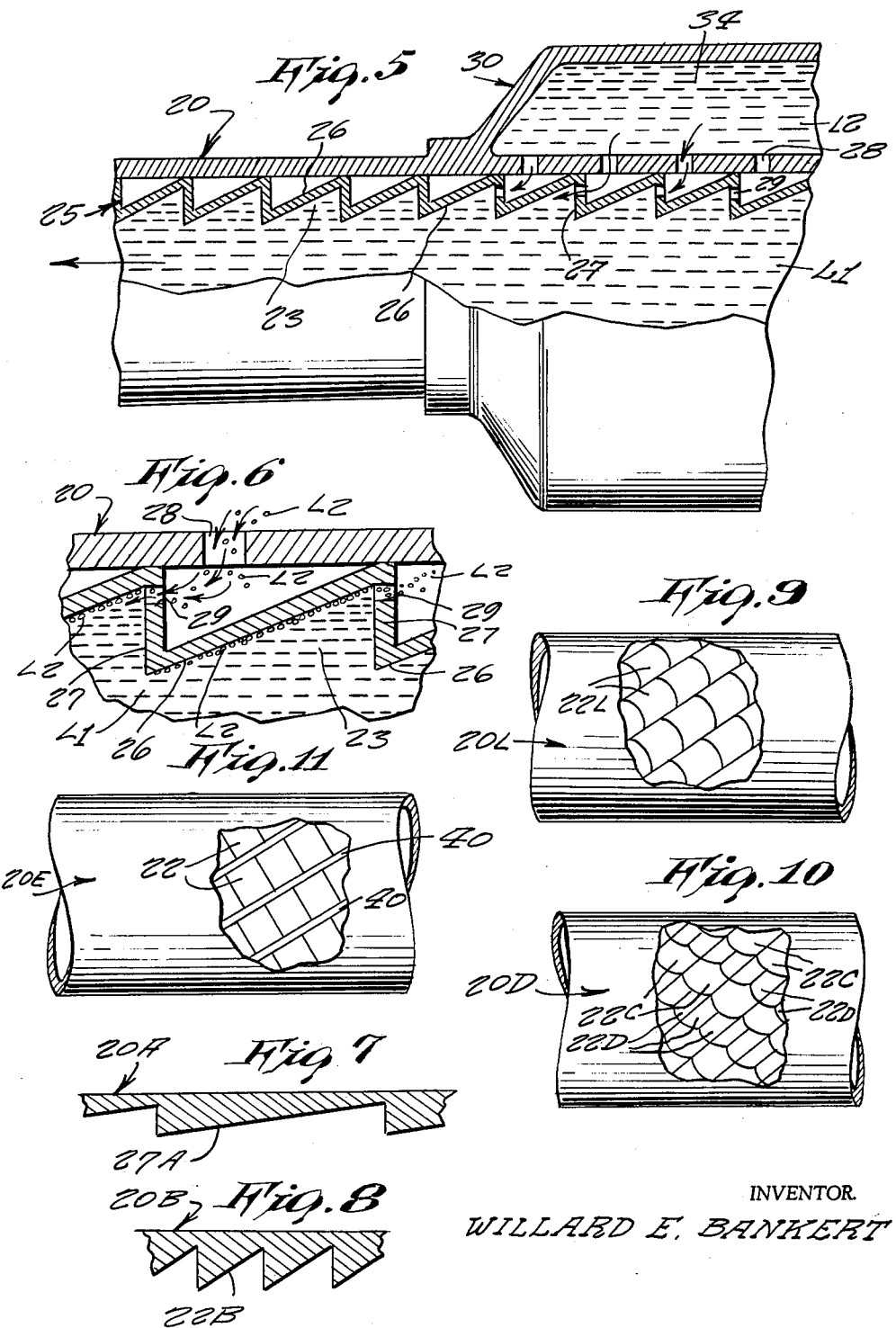

3,175,571
HYDRAULIC LINER FOR CONDUITS
Willard E. Bankert, 360 W. 22nd St., New York, N.Y.
Filed July 15, 1963, Ser. No. 294,872
7 Claims. (Cl. 137—111)

This invention relates generally to transporting fluids by pipe lines and more particularly to means for reducing surface friction between the fluid and the pipe line transporting such fluid.

The problem of surface friction in pipe lines used for transporting fluid is not new and is greatly amplified when the transported fluid is highly viscous. To overcome the effects of surface friction, booster pumps are required at spaced intervals along a pipe line. Line lubrication has been tried with little success because of rapid loss of the lubricants and because of insufficient lubricated areas. Examples of line lubrication are provided by U.S. Patent 2,821,205 granted January 28, 1958, to E. G. Chilton et al., and U.S. Patent 3,040,760 granted June 26, 1962, to E. F. Macks.

Accordingly, an object of this invention is to provide effective line lubrication for reducing line loss in pipe systems.

Another object of this invention is to provide the foregoing having capabilities of reducing rapid loss of the lubricant.

And another object of this invention is to provide flow surfaces in a pipe line which tend to reduce line loss.

And another object of this invention is to provide the foregoing which cooperates with the addition of a lubricant to reduce frictional losses and retards the loss of the added lubricant.

The foregoing and other objects and advantages will be more fully understood by those skilled in the art by referring to the following description and the accompanying drawings wherein:

FIGURE 1 is a schematic illustration of the principal components of a pipe line made in accordance with the present invention, FIGURE 2 is an enlarged perspective view of a portion of the conduit of FIGURE 1 with one end laid open, FIGURE 3 is an enlarged sectional view taken on line 3—3 of FIGURE 1, FIGURE 4 is an enlarged sectional view of a portion of the conduit of FIGURE 3, FIGURE 5 is a sectional view similar to FIGURE 3 illustrating a modified form thereof, FIGURE 6 is an enlarged section view similar to FIGURE 4 illustrating corresponding details of the modification of FIGURE 5, FIGURES 7 and 8 are sectional views showing modified surface forms, FIGURES 9, 10 and 11 are plan views of portion of conduit in accordance with the present invention with parts cut away to show the inner surface of each of the conduits, FIGURE 12 is a view similar to FIGURE 1 illustrating a modification thereof.

As shown in FIGURE 1 a pipe line is comprised of a plurality of pipes 20 connected in series by jackets 30. A pump 21 provides a viscous liquid L1 to be transported. A fluid L2 of lower viscosity than liquid L1 is provided in reservoirs 31 connected to jackets 30 by lines 32. Each line 32 may include a small pump 33 for the fluid L2. As shown in FIGURES 2, 3, 4, 7 and 8 the inner surface of conduits 20 are formed by a plurality of helically extending lines of slanted surfaces 22 each forming a pocket 23 of maximum depth at the upstream end thereof. Each surface 22 forms a ramp for fluid L2 moving downstream and toward the center of the conduit 20.

Jacket 30 forms an annular chamber 34 around the conduit 20 and is in communication therewith through ports 24 at the upstream end of pockets 23 in the area of the jacket. As shown, jacket 30 may be integral with one end of a conduit 20 or may be sealingly connected thereto in any well known manner (not shown). Liquid L2 from a reservoir 31 passes through a conduit 32 to chamber 34 and flows through ports 24 into pockets 23. The lower viscous fluid L2 thus tends to flow along the ramp surfaces 22, such movement being resisted by the flow of liquid L1 in the line. Thus liquid L2 tends to fill the recess of cavities 23 and only a small amount is carried downstream. However, the line loss between liquids L1 and L2 is lower than would be the line loss due to friction of flowing liquid L1 and the conduit 20. The irregular surfaces provided by ramps 22 also tend to create a burble which would reduce the conduit surface which the outer layer of fluid L1 would contact.

In existing lines, a liner 25 may be disposed in the unprofiled pipes 20. Liners 25 have surfaces 26 corresponding to surfaces 22 and form with surfaces 27, normally disposed in the line, pockets or recesses 23. In place of ports 24, conduit 20 has a plurality of ports 28 which are connected to pockets 23 by ports 29 in walls 27. As shown in FIGURES 7 to 11, ramp surfaces 22 or 26 may be flat or arcuate, of constant or varying width, and of relatively flat or sharp slope, the helical lines of ramps 22 may be separated by grooves or ridges 40 forming a rifling therebetween.

A modified arrangement is shown in FIGURE 12 wherein the downstream end of a jacket 130 is smaller than the upstream end. Jacket 130 corresponds in all other ways to jackets 30 and connects a conduit 20 to a similar conduit 120 which is merely of smaller diameter. As liquid L1 flows at a line speed from conduit 20 to jacket 130 hence to conduit 120 the flow speed will increase. This acceleration is enhanced by induction of the lubricant fluid L2. In addition to the pump 33, a pressure regulator may be disposed in line 32 to control the flow of lubricant L2.

While I have shown and described the preferred embodiment of my invention, it will be understood that minor changes in construction, combination, and arrangement of parts may be made without departing from the spirit and scope of my invention as claimed.

I claim:

1. A lubricated pipe line for transporting fluid, comprising a plurality of pipe sections connected in series to one another, each pipe section having an inner wall covered with pockets disposed in spiral series along each pipe section, a plurality of jackets encircling the pipe line, being spaced from one another, each forming with one of the pipe sections an annular chamber for lubricant fluid of lower viscosity than the fluid in the pipe line, and wherein there are provided ports from the annular chamber to the said pockets, causing the passage of lubricant fluid from the said annular chamber to the said pockets, each of the pockets is formed by a sloped surface and a surface substantially normal to the flow path at the upstream end of said sloped surface so each chamber has its greatest depth at its upstream end.

2. A lubricated pipe line in accordance with claim 1 in which said ports each communicate at the upstream end of a pocket.

3. A lubricated pipe line in accordance with claim 2 wherein a plurality of reservoirs are provided to store lubricant fluid each being connected by a line to one of said jackets, and a pump being disposed in each of said lines to positively supply lubricant fluid to each jacket.

4. A lubricated pipe line in accordance with claim 3 in which one of said jackets connects one pipe section to the next pipe section in series which is smaller than the pipe section connected upstream therefrom.

5. A lubricated pipe line in accordance with claim 4 and a pressure regulator connected in the line between a pump and an annular jacket connected thereto for blocking flow of lubricant fluid from a reservoir when the pressure in the pipe section to which the jacket is connected falls below a predetermined minimum.

6. A lubricated pipe line in accordance with claim 1 in which said pockets are formed in a liner disposed in each pipe section.

7. A lubricated pipe line for transporting fluid comprising a plurality of pipe sections connected in series to one another, each pipe section having an inner wall with pockets arranged in a spiral configuration, including a plurality of jackets, each encircling one of the pipe sections, and being spaced from one another, wherein each forms with one of the pipe sections, an annular chamber for lubricant fluid of lower viscosity than the fluid in the pipe line, and wherein there are provided ports from the said annular chamber to the said pockets, wherein the flow of the fluid in the pipe line will cause lubricant fluid from the chamber to be drawn into the pockets and propelled in a directional flow in the pipe line along the spiral path defined by the said pockets, said pockets being so formed that the spirally forward movement of the lubricant fluid along and about the axis of the pipe line will cause the said lubricant fluid to be retained in the pockets.

References Cited by the Examiner
UNITED STATES PATENTS

| 372,299 | 11/87 | Chamberlin | 137—13 |
| 898,741 | 9/08 | Isaacs | 138—39 |
| 1,753,662 | 4/30 | Merker | 137—111 |

M. CARY NELSON, *Primary Examiner.*